May 21, 1940.                  S. L. LANE                    2,201,186
                              THERMOMETER
                          Filed Oct. 14, 1938

INVENTOR:
STANTON L. LANE,
BY:
Christian R. Nielsen,
ATTORNEY.

Patented May 21, 1940

2,201,186

UNITED STATES PATENT OFFICE 2,201,186

THERMOMETER

Stanton L. Lane, Fuquay Springs, N. C.

Application October 14, 1938, Serial No. 235,061

2 Claims. (Cl. 73—376)

This invention relates to thermometers and particularly to means for indicating a temperature from a considerable distance, and it consists in the constructions, arrangements and combinations herein described and claimed.

It is a particular object of the invention to provide a visual indicator means complemental to the temperature responsive fluid of a thermometer, and in which the indicator means is adjustable longitudinally of the fluid responsive tube for variable setting thereof.

It is also an object of the invention to provide a slide indicator in which a novel spring means is employed for maintaining the indicator means in a fixed position with respect to the fluid responsive tube, yet freely adjustable to varying degrees of temperature on the tube so that the temperature will be readily discernible from a distance.

Additional objects, advantages and features of invention will be apparent from the following description and accompanying drawing, wherein.

Figures 1, 2:
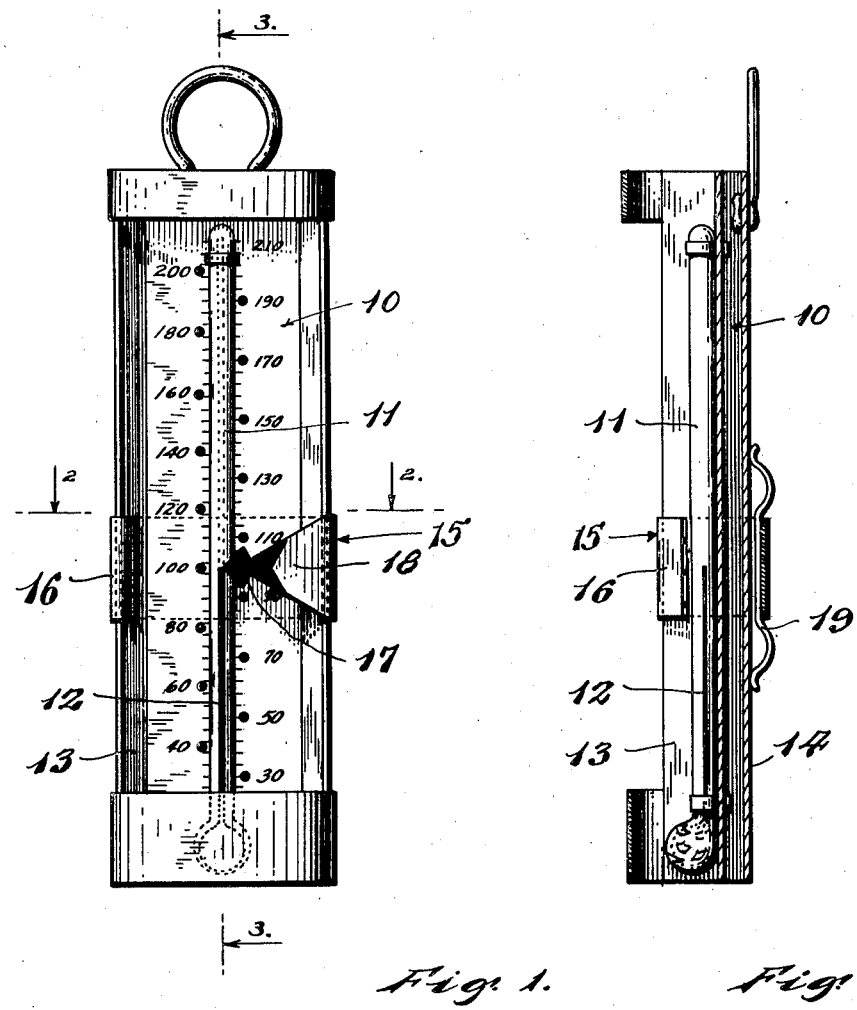
Figure 1 is a front elevation of a thermometer with my indicator applied.
Figure 2 is a cross section on the line 2—2 of Figure 1.

There is illustrated a thermometer 10 of approved construction including a temperature responsive tube 11 in which a colored fluid 12 is enclosed, the latter expanding when heated and contracting when cold, thereby varying the reading of the temperature.

The casing of the thermometer comprises side walls 13 slightly inclined rearwardly from the open face of the casing, and integrally connected with the back wall 14, providing a mounting for a slidable indicator 15, now to be described.

The indicator 15 is formed from a suitable gauge sheet metal blank of any approved width, one end of which is bent to form a hook-like member 16, adapted to engage over the edge of one wall 13; the end of the blank being shaped in the form of an arrow or dart 17, the latter being bent so as to engage over the edge of the other wall 13. The arrow portion 17 is of a length stopping on the longitudinal axis of the tube 11 and is bent downwardly to contact the periphery of the tube, as clearly shown in Figure 3. The arrow 17 and a substantial portion of the stem 18 thereof is painted or otherwise colored similar to the color of the fluid within the tube.

Figure 3:
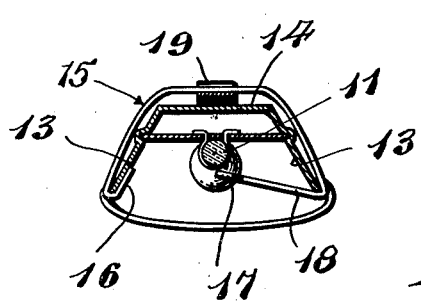
Figure 3 is a cross section on the line 3—3 of Figure 1.

The indicator 15 lies rearwardly of the back wall 14 as shown in Figure 3, for accommodation of a leaf spring 19 presented in bearing contact between the wall and the inner face of the indicator. Thus, it will be apparent that by pressing inwardly upon the indicator at the contacting portion with the spring, the hook 16 and stem 18 will be moved to clear the edges of the walls 13, when the indicator may be moved to any desired setting.

The indicator will be found highly efficient in many situations such as in stores, warehouses and in like places, although the present thermometer and indicator has been devised for use in tobacco curing barns where a given temperature must be maintained involving numerous thermometers located in remote situations and require considerable walking of attendants. However, with the arrow colored the same as the fluid in the tube 11 and closely overlying or contacting the tube a pronounced indication of the temperature is given which may be discerned from considerable distances.

While I have shown and described a preferred construction, this is by way of illustration only, and I consider as my own, all such modifications in structure as fairly fall within the scope of the appended claims.

I claim:

1. In an indicating thermometer, an elongated casing U-shaped in cross section, a thermometer tube carried thereby, a temperature responsive fluid in the tube, a slide extending across the back of the casing, said slide having a hook-like member for engaging an edge of the casing and a stem portion engaging the other edge of the casing, spring means between the slide and the back of casing for maintaining the slide in an adjusted position and said stem portion having an arrow of a length contacting the tube medially of its longitudinal axis.

2. In an indicating thermometer, an elongated casing U-shaped in cross section, a thermometer tube carried thereby, a colored temperature responsive fluid in the tube, a slide extended across the back of the casing, said slide having a hook-like member for engaging an edge of the casing and a stem portion engaging the other edge of the casing, spring means between the slide and the back of the casing for maintaining the slide in an adjusted position and said stem portion having an indicator pointer of a length contacting the tube medially of its longitudinal axis, said pointer having a color corresponding to the fluid in the tube.

STANTON L. LANE.